US011125558B2

(12) United States Patent
Bernhard et al.

(10) Patent No.: US 11,125,558 B2
(45) Date of Patent: Sep. 21, 2021

(54) AUTO CENTERING LEVELLING

(71) Applicant: LEICA GEOSYSTEMS AG, Heerbrugg (CH)

(72) Inventors: Heinz Bernhard, Berneck (CH); Hannes Maar, Dornbirn (AT); Dimitri Tsymbal, St. Gallen (CH); Benjamin Grabherr, Höchst (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 80 days.

(21) Appl. No.: 16/814,927

(22) Filed: Mar. 10, 2020

(65) Prior Publication Data

US 2020/0292310 A1 Sep. 17, 2020

(30) Foreign Application Priority Data

Mar. 11, 2019 (EP) .................................... 19162046

(51) Int. Cl.
*G01C 25/00* (2006.01)
*G01C 15/00* (2006.01)

(52) U.S. Cl.
CPC ......... *G01C 15/008* (2013.01); *G01C 25/005* (2013.01)

(58) Field of Classification Search
USPC .......................................................... 33/291
See application file for complete search history.

(56) References Cited

U.S. PATENT DOCUMENTS

| 4,035,084 | A | * | 7/1977 | Ramsay | ............... | F16M 11/046 |
| | | | | | | 356/139.08 |
| 5,212,889 | A | * | 5/1993 | Lysen | .................. | G01C 15/105 |
| | | | | | | 33/227 |
| 5,606,802 | A | * | 3/1997 | Ogawa | ................... | G01B 11/26 |
| | | | | | | 33/276 |
| 5,872,657 | A | * | 2/1999 | Rando | .................. | G01C 15/004 |
| | | | | | | 359/629 |
| 6,688,011 | B2 | * | 2/2004 | Gamal | ................ | G01C 15/004 |
| | | | | | | 33/281 |

(Continued)

FOREIGN PATENT DOCUMENTS

WO   WO-2005059473 A2 *  6/2005 ............. G01C 25/00

OTHER PUBLICATIONS

European Search Report dated Sep. 12, 2019 as received in Application No. 19162046.7.

*Primary Examiner* — Christopher W Fulton
(74) *Attorney, Agent, or Firm* — Maschoff Brennan

(57) ABSTRACT

A surveying system can include a surveying instrument, a control system, a tilt measuring system, a levelling unit, a camera system, and a second distance meter, wherein the control system is configured for obtaining an image position of a captured image, adjusting a tilt status until a first tilt status is obtained, the second distance meter aiming onto the location on the ground in the first tilt status, determining the first tilt status, effecting the second distance meter to measure a distance to the location on the ground, effecting a first angle encoder to measure a rotatory position of a support unit, effecting the levelling unit to adjust the tilt status, and calibrating a preconfigured centre point based on the distance to the location on the ground, a deviation between the first tilt status and the second tilt status, and/or the rotatory position of the support unit.

15 Claims, 2 Drawing Sheets

(56) References Cited

U.S. PATENT DOCUMENTS

| | | | |
|---|---|---|---|
| 8,345,928 B2* | 1/2013 | Svanholm | G01C 1/04 |
| | | | 382/106 |
| 8,629,905 B2* | 1/2014 | Svanholm | G01C 1/04 |
| | | | 348/135 |
| 2002/0053144 A1* | 5/2002 | Matsumoto | G01C 15/105 |
| | | | 33/283 |
| 2009/0220144 A1* | 9/2009 | Mein | G01C 1/04 |
| | | | 382/154 |
| 2016/0076885 A1 | 3/2016 | Nishita | |
| 2018/0003493 A1 | 1/2018 | Bernhard et al. | |
| 2018/0347980 A1 | 12/2018 | Kotzur et al. | |
| 2020/0166340 A1* | 5/2020 | Hinderling | F16M 11/125 |

* cited by examiner

AUTO CENTERING LEVELLING

CROSS-REFERENCE TO RELATED APPLICATIONS

This application claims priority to European Patent Application No. 19162046.7 filed on Mar. 11, 2019, which is incorporated herein by reference.

FIELD OF THE INVENTION

The present invention relates to a surveying system comprising a surveying instrument and a control system. Generic surveying instruments are e.g. total stations, laser scanner, or laser trackers and pertain to the fields of geodesy and/or metrology.

BACKGROUND OF THE INVENTION

Surveying instruments are normally set up in a given (local or global) coordinate reference frame. To use standard setup and orientation methods, it is a common procedure to set up the surveying instrument directly over a discrete ground point with known or unknown coordinates using e.g. a tripod.

This procedure usually required three manual steps. At first, the surveying instrument is precisely centred above the ground point. This is usually done with the help of a laser plummet, an optical plummet or a downward facing camera. The second step is to level the instrument, i.e. to align the standing axis with the gravity field. This is usually done with the help of an analogue and/or digital circular bubble level and by adjusting tripod legs and/or tribrach foot screws. As a third step, the height from the ground point to the tilting axis of the instrument is measured in order to be able to transfer the ground point coordinates to station coordinates. This is usually done with the help of an analogue tape measure or an EDM laser plummet.

All these steps are mostly done manually and require a thorough operation of the surveyor because an inaccurate centering has a negative impact on all later measured points and can hardly be corrected in post-processing since there is not much documentation of the centering & levelling steps. Furthermore, the described steps must often be done iteratively and can therefore be very time consuming.

SUMMARY OF THE INVENTION

In some embodiments, the invention provides an improved surveying system which reduces these manual setup steps to a minimum. A surveying system according to the invention allows for a more ergonomic, more intuitive, more efficient, more accurate, and more reliable surveying process.

In some embodiments, the invention provides the technical advantage that no manual, iterative instrument (dis)placements are necessary—the surveyor only needs to set up the tripod in a roughly levelled status. A further advantage is that no additional accessories are needed such as analogue tape measures. Other advantages are that the setup time is reduced and that the setup process can be automatically documented with ground images, tilt statuses, angles, and measured distances.

In some embodiments, the invention relates to a surveying system comprising a surveying instrument and a control system, the surveying instrument comprising a base unit, a support unit mounted on the base unit and configured for being rotatable relative to the base unit around a yaw axis, a targeting unit comprising a first distance meter, the targeting unit being mounted on the support unit and configured for being rotatable relative to the support unit around a pitch axis, a first angle encoder configured for measuring a rotatory position of the support unit, a second angle encoder configured for measuring a rotatory position of the targeting unit, the control system configured for controlling the surveying instrument and determining a spatial point relative to a preconfigured centre point of the surveying instrument, wherein the surveying system further comprises a tilt measuring system configured for determining a tilt status of the yaw axis with respect to a longitudinal direction and a transversal direction relative to the gravity field, a levelling unit configured for adjusting the tilt status, wherein the base unit is configured for being mounted on the levelling unit, and a camera system configured for capturing an image of a ground under the levelling unit, a second distance meter configured for measuring a distance to a point on the ground along a pointing axis, the pointing axis and the yaw axis having a known pose relative to each other, wherein the control system is configured for at least one of receiving and determining an image position of the image, the image position corresponding to a location on the ground, effecting the levelling unit to adjust the tilt status, based on the image position, until a first tilt status is obtained, the second distance meter aiming onto the location on the ground in the first tilt status, effecting the tilt measuring system to determine the first tilt status, effecting the second distance meter to measure a distance to the location on the ground, effecting the first angle encoder to measure a rotatory position of the support unit, effecting the levelling unit to adjust the tilt status, based on sampling the tilt measuring system, until a second tilt status is obtained, the yaw axis being aligned with the gravity field in the second tilt status, calibrating the preconfigured centre point based on the measured distance to the location on the ground, a deviation between the determined first tilt status and the second tilt status, and the measured rotatory position of the support unit. In particular, the determining a spatial point is based on a measurement with the first distance meter and the first and second angle encoders.

In some embodiments, the tilt measuring system may further comprise a first inclinometer configured for a first level of accuracy and a first working range, and a second inclinometer configured for a second level of accuracy higher than the first level of accuracy and a second working range smaller than the first working range.

In some embodiments, the determination of the first tilt status may comprise, if the yaw axis is out of the second working range, sampling the first inclinometer, and, if the yaw axis is within the second working range, sampling the second inclinometer.

In some embodiments, sampling the tilt measuring system may comprise, as long as the yaw axis is out of the second working range, sampling the first inclinometer, and, once the yaw axis is within the second working range, sampling the second inclinometer.

In some embodiments, effecting the levelling unit to adjust the tilt status until a first tilt status is obtained may be based on a transformation of the image position into the first tilt status or a tilt status adjustment that leads to the first tilt status.

In some embodiments, the control system is configured for receiving the image position, the receiving may be based on a user selection, wherein the surveying system can comprise a display device configured for connecting to the control system, for displaying the captured image, and for accepting the user selection as input.

In some embodiments, the control system is configured for determining the image position, the determining may be based on image processing.

In some embodiments, the image position may be corresponding to a survey point on the ground.

In some embodiments, the pointing axis and a field of view of the camera system may have a known pose relative to each other, and wherein effecting the levelling unit to adjust the tilt status until a first tilt status is obtained is further based on the relative pose between the pointing axis and the field of view of the camera system and based on the relative pose between the pointing axis and the yaw axis.

In some embodiments, the camera system may comprise one or more cameras, the camera system configured for providing an image, a stitched image, or a live stream of images.

In some embodiments, the camera system may be configured for being mountable on the surveying instrument, on a tripod, or on the levelling unit, or the camera system may be embodied as or comprised by a handheld device. In particular, the camera system can be comprised by a smart phone, wherein an app running on the smart phone can communicate with the levelling unit, the control system, or the surveying instrument and a user captures the area on the ground under the levelling unit with the smart phone camera.

In some embodiments, the second distance meter and the camera system may be kinematically linked.

In some embodiments, the invention also relates to a method for calibrating a preconfigured centre point of a surveying instrument comprised by a surveying system, the method comprising, with the control system: capturing a first image of a ground under the levelling unit, at least one of receiving and determining an image position of the first image, the image position of the first image corresponding to a location on the ground, effecting the levelling unit to adjust the tilt status, based on the first image position of the first image, until a first tilt status is obtained, the second distance meter aiming onto the location on the ground in the first tilt status, effecting the tilt measuring system to determine the first tilt status, effecting the second distance meter to measure a first distance to the location on the ground, effecting the first angle encoder to measure a first rotatory position of the support unit, effecting the levelling unit to adjust the tilt status, based on sampling the tilt measuring system, until a second tilt status is obtained, the yaw axis being aligned with the gravity field in the second tilt status, calibrating, at a first time, the preconfigured centre point based on the measured first distance to the location on the ground, a deviation between the determined first tilt status and the second tilt status, the first measured rotatory position of the support unit.

In some embodiments, the method may further comprise the steps: collecting measurement data with the surveying system, capturing a second image of a ground under the levelling unit, at least one of receiving and determining an image position of the second image a second time, the image position of the second image corresponding to the location on the ground, effecting the levelling unit to adjust the tilt status, based on the image position of the second image, until a third tilt status is obtained, the second distance meter aiming onto the location on the ground in the third tilt status, effecting the tilt measuring system to determine the third tilt status, effecting the second distance meter to measure a second distance to the location on the ground, effecting the first angle encoder to measure a second rotatory position of the support unit, effecting the levelling unit to adjust the tilt status, based on sampling the tilt measuring system, until a fourth tilt status is obtained, the yaw axis being aligned with the gravity field in the fourth tilt status, calibrating, at a second time, the preconfigured centre point, which was calibrated at the first time before collecting the measurement data, based on the second measured distance to the location on the ground, a deviation between the determined third tilt status and the fourth tilt status, the second measured rotatory position of the support unit, in case the calibrating at the second time results in a correction of the preconfigured centre point and said correction amounting higher than a threshold correction, correcting the measurement data based on the calibrating at the second time.

In some embodiments, the invention also relates to a levelling unit designed for being modularly mounted under a surveying instrument, wherein the surveying instrument comprises a base unit configured for positioning the surveying instrument, a support unit mounted on the base unit and configured for being rotatable relative to the base unit around a yaw axis, a targeting unit comprising a first distance meter, the targeting unit being mounted on the support unit and configured for being rotatable relative to the support unit around a pitch axis, a first angle encoder configured for measuring a rotatory position of the support unit, a second angle encoder configured for measuring a rotatory position of the targeting unit, a first control unit configured for controlling the surveying instrument and determining a spatial point relative to a preconfigured centre point of the surveying instrument, a second distance meter configured for measuring a distance to a point on the ground along a pointing axis, the pointing axis and the yaw axis having a known pose relative to each other, wherein the levelling unit comprises a recess configured for allowing the pointing axis to pass through, a tilt measuring system configured for determining a tilt status of the yaw axis with respect to a longitudinal direction and a transversal direction relative to the gravity field, wherein the levelling unit is configured for adjusting the tilt status, a camera system configured for capturing an image of a ground under the levelling unit, a second control unit configured for connecting to the first control system, and for at least one of receiving and determining an image position of the image, the image position corresponding to a location on the ground, effecting the levelling unit to adjust the tilt status, based on the image position, until a first tilt status is obtained, the second distance meter aiming onto the location on the ground in the first tilt status, effecting the tilt measuring system to determine the first tilt status, effecting the second distance meter to measure a distance to the location on the ground, effecting the first angle encoder to measure a rotatory position of the support unit, effecting the levelling unit to adjust the tilt status, based on sampling the tilt measuring system, until a second tilt status is obtained, the yaw axis being aligned with the gravity field in the second tilt status, calibrating the preconfigured centre point based on the measured distance to the location on the ground, a deviation between the determined first tilt status and the second tilt status, and the measured rotatory position of the support unit.

BRIEF DESCRIPTION OF THE DRAWINGS

By way of example only, preferred embodiments of the invention will be described more fully hereinafter with reference to the accompanying figures, wherein.

DETAILED DESCRIPTION

Figure 1:
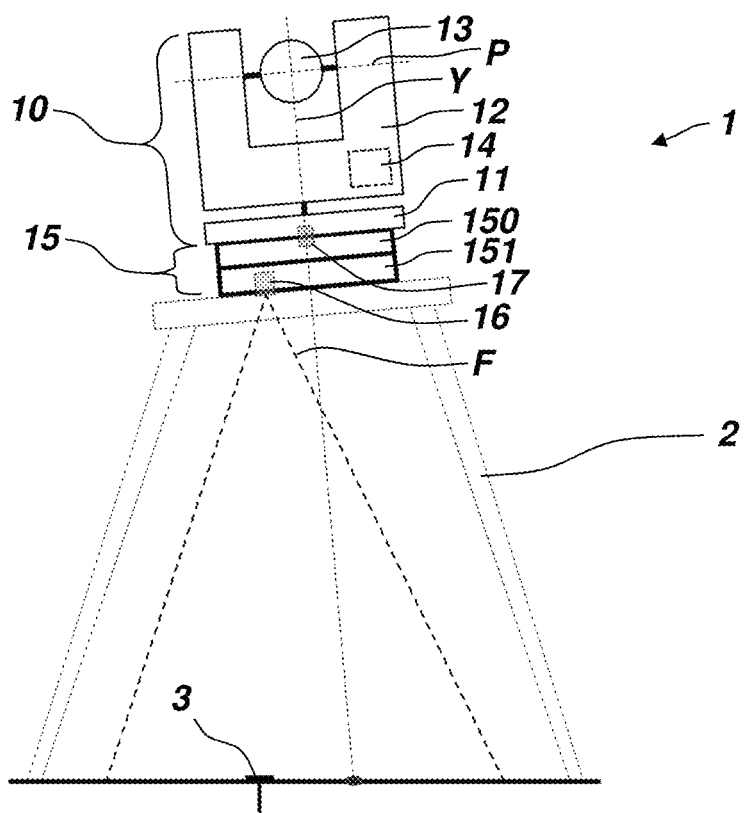
FIG. 1 shows a surveying system being setup above a survey point.

FIG. 1 shows a surveying system 1 comprising a surveying instrument 10 and a control system (not shown). The control system can be built into or attachable to the surveying instrument 10, outsourced to a remote server, or embodied by an external control device used by the surveyor, e.g. a smart phone or a dedicated surveying controller. Alternatively, the components of the control system can be distributed on two or more of the surveying instrument, the remote server, and the external control device, wherein the components are configured to communicate with each other.

The surveying instrument 10 is embodied as a total station, however it could in other embodiments be a laser tracker or laser scanner.

The surveying instrument 10 comprises a base unit 11 configured for positioning the surveying instrument, a support unit 12 mounted on the base unit and configured for being rotatable relative to the base unit around a yaw axis Y (also referred to as standing axis), a targeting unit 13 comprising a first distance meter (not shown), the targeting unit 13 being mounted on the support unit 12 and configured for being rotatable relative to the support unit around a pitch axis P, a first angle encoder (not shown) configured for measuring a rotatory position of the support unit, and a second angle encoder (not shown) configured for measuring a rotatory position of the targeting unit.

The control system is configured for controlling the surveying instrument 10 and determining a three-dimensional point relative to a preconfigured centre point of the surveying instrument 10. The coordinates of the determined point are based on a measurement of the two angles (one with respect to the pitch axis P and the other with respect to the yaw axis Y) and a distance measurement performed by the first distance meter in the targeting unit 13. Particularly, a plurality of points is measured as a point cloud wherein the spatial arrangement of the single points is captured in a coordinate system with the preconfigured (and later calibrated) centre point as origin.

The surveying system further comprises a tilt measuring system 14, which is here shown to be located inside the support unit 12 of the surveying instrument. However, in other embodiments, the tilt measuring system 14 may be arranged in the targeting unit 13, or the base unit 11. In yet another embodiment, the tilt measuring system 14 may be located in a movable part 150 of a levelling unit 15 comprised by the surveying system 1. The tilt measuring system 14 is configured for determining a tilt status of the yaw axis Y with respect to a longitudinal direction and a transversal direction relative to the gravity field. A tilt status is particularly expressed by a numerical representation of the yaw axis tilt, i.e. for example by two angle coordinates. Thus, when stating that a tilt status is determined, it particularly means that the numerical representation of the tilt status is determined.

Preferably, the tilt measuring system 14 comprises a first inclinometer and a second inclinometer. The first inclinometer may be configured for precisely measuring a longitudinal and a transversal tilt of the yaw axis in a limited working range. The second inclinometer may be configured for measuring in a less accurate manner compared to the first inclinometer, this however in a larger working range.

The levelling unit 15 is arranged under the surveying instrument 10, or in other words, the surveying instrument 10 is mounted rigidly on the levelling unit 15. The levelling unit 15 is configured for adjusting the tilt status. Once the surveying instrument 10 is mounted on the levelling unit 15, the yaw axis Y has a fixed alignment relative to a movable part 150 of the levelling unit 15. From a known tilt status and a known current position of the movable part 150 relative to a rigid part 151, the way in which the rigid part 151 of the levelling unit 15 is tilted relative to the gravity field may be derivable. For determining a current position of the movable part 150 relative to a rigid part 151, the levelling unit 15 may comprise absolute or relative detectors/encoders. The levelling unit may comprise actuators, in particular servo motors or piezo motors.

By the levelling unit 15, the surveying system 1 is mounted on top of an optional tripod 2. As well, a tripod or a similar structure could be part of the rigid part 151, or instead of the tripod 2, a similar structure could be used.

The surveying system further comprises a camera system 16 configured for capturing an image of a ground under the levelling unit. The camera system 16 is shown here comprising only one camera having a field of view F. However, the camera system 16 can comprise two or more cameras, in particular wherein the fields of view of the two or more cameras can overlap such that the camera system can generate a stitched image. In more general terms, the one or more cameras are downward-facing and capable of taking pictures of the ground area below the instrument.

The camera system 16 is shown here positioned eccentrically with regard to the yaw axis Y. Preferably, the optical axis of the camera(s) is aiming roughly towards where the yaw axis Y is hitting the ground. At least, however, the field of view of the camera(s) captures an area of the ground under the surveying system 1 that is appropriately large. The coverage of the camera system 16 includes at least a centre zone under the surveying system 1. The camera of camera system 16 is here shown being incorporated in the rigid part 151 of the levelling unit 15. Of course, whatever the levelling unit 15 stands on (in this case the tripod 2), needs to have a recess for allowing the camera system 16 a view of the ground. The one or more cameras of the camera system may however also be mountable onto the tripod or any other part that is independent from the movement of the movable part 150 of the levelling unit 15.

In another embodiment, the camera system or at least one camera of the camera system is located in the base unit 11 of the surveying instrument 10, wherein the levelling unit 15 has an according recess to allow the field of view to pass through. In this case, the camera or camera system may be positioned eccentrically with regard to the yaw axis Y, or in a special embodiment, the camera or camera system may be installed on axis with the second distance meter, which can be realised with deflection mirrors when the centre position is already occupied by the second distance meter.

The surveying system further comprises a second distance meter 17 configured for measuring a distance to a point on the ground along a pointing axis, the pointing axis and the yaw axis Y having a known pose relative to each other. In a preferable embodiment, which is shown here, the pointing axis of the second distance meter 17 is aligned with the yaw axis Y. However, if the position and orientation of the second distance meter 17 relative to the yaw axis Y is known, the two axes need not be aligned necessarily.

In the shown embodiment, the optical axis of the camera of the camera system 16 and the pointing axis of the second distance meter 17 are not aligned. However, as was suggested above, they can also be aligned on one common axis, e.g. by providing a deflection mirror for at least one of the camera and the second distance meter 17. Accordingly, both the camera system and the second distance meter could be provided in the base unit of the surveying instrument. But they could also both be provided in the levelling unit.

The surveying system may further comprise a light source for shortening an exposure time of the camera system by emitting a light.

The mounting place of the second distance meter 17 is shown here to be between the base unit 11 and the movable part 150 of the levelling unit. However, the second distance meter 17 may be integrated in only one of these components. Of course, whatever the levelling unit 15 stands on (in this case the tripod 2), needs to have a recess for allowing the second distance meter 17 visual access to the ground. In other embodiments, the second distance meter 17 may be mountable to the tripod 2 or the rigid part 151 of the levelling unit—then, however, means for tilting the second distance meter 17 would have to be provided, and the relative pose of the second distance meter 17 and the yaw axis Y has to be known at all times.

The control system of the surveying system is configured for receiving and/or for determining an image position of an image captured by the camera system 16, wherein the image position corresponds to a location on the ground that is captured. Specifically, said location on the ground may be a survey point 3 or any other reference point with respect to which the preconfigured centre point shall be calibrated, for example also referred to as landmark.

The wording "receiving and/or determining" is chosen because on the one hand, the image position can be received by the control system based on a user input or any upstream unit, and on the other hand, the image position can be determined by the control system based on image processing (e.g. feature recognition). The image position can however also both be received and then determined, e.g. because the user input was not accurate enough, so the determining based on image processing is additionally applied in order to get a more precise specification of the image position. However, the determining may also be applied first and the receiving afterwards, e.g. in case the control system analysed the image with feature detection/recognition and then determined candidate locations on the image, wherein the reception of the image position makes the choice of a candidate. More details on the possible embodiments of the control system in this regard will be explained later with FIGS. 4a-c and 5a-c.

Figure 2:
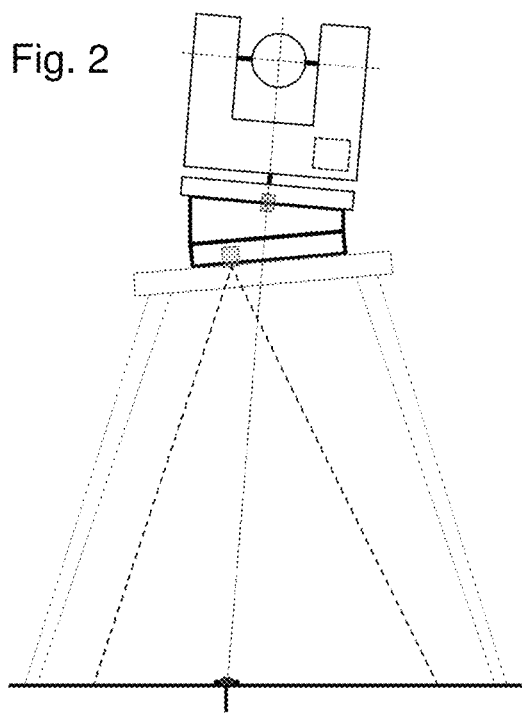
FIG. 2 shows the surveying system from FIG. 1 when the survey point is targeted by a distance meter of the surveying system.

The control system is further configured for effecting the levelling unit 15 to adjust the tilt status, based on the image position, until a first tilt status is obtained, wherein—in the first tilt status—the second distance meter 17 is aiming onto the location on the ground that corresponds to the image position that has been received and/or determined. Namely, in this example, the second distance meter 17 is aiming onto the survey point 3. The first tilt status is reached in FIG. 2. Here, it can be seen, that the movable part 151 of the levelling unit 15 tilted the surveying instrument 10 and the second distance meter 17 in such a way that the pointing axis and therewith the yaw axis aims at the survey point. Preferably, the second distance meter 17 comprises a functionality of a laser pointer with visible light so that the current projection of the second distance meter 17 on the ground can be observed at any time.

The surveying instrument 10 is brought into the first tilt status based on the image position. This is possible because there is a known spatial correspondence between positions on an image (i.e. image coordinates) and the emission direction of the second distance meter 17 (pointing axis), and, in this case, thus the yaw axis. Based on reading the tilt measuring system 14, the levelling unit 15 can adjust the tilt status such that the pointing axis is guided on the location on the ground for which the position in the image was received and/or determined. In other words, the image position of the image is translated into a tilt status adjustment versus the current tilt status (as the surveying system was placed according to FIG. 1), i.e. into a relative adjustment.

The control system is further configured for effecting the tilt measuring system 14 to determine the first tilt status, and then storing it. The first tilt status is determined as a numerical representation of the tilt of the surveying instrument 10 relative to the gravity field.

The control system is further configured for effecting the second distance meter 17 to measure a distance to the location on the ground (the surveying instrument 10 still being in the first tilt status) and storing the measured distance.

The control system is further configured for effecting the first angle encoder to measure a rotatory position of the support unit (the surveying instrument 10 still being in the first tilt status) and storing the measured rotatory position of the support unit 12. The measured rotatory position is a numerical representation of a rotation of the support unit 12 around the yaw axis Y relative to a reference rotatory position.

Figure 3:
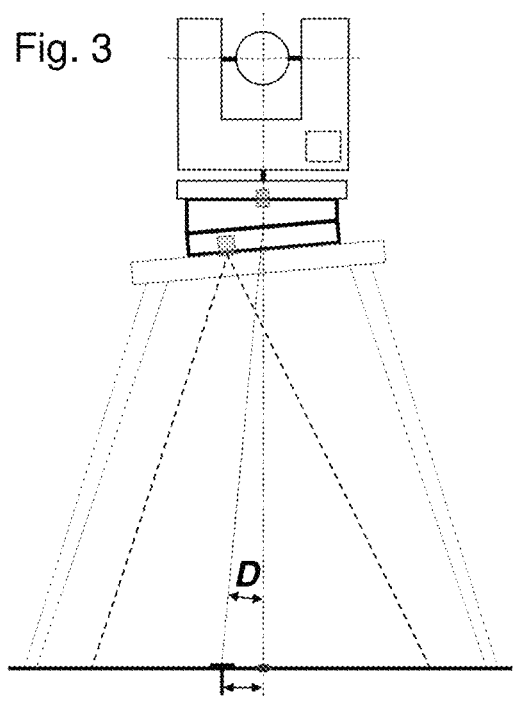
FIG. 3 shows the surveying system from FIGS. 1 and 2 when a levelling unit of the surveying system levelled a surveying instrument of the surveying system.

The control system is further configured for effecting the levelling unit to adjust the tilt status, based on sampling the tilt measuring system, until a second tilt status is obtained, wherein—in the second tilt status—the yaw axis is aligned with the gravity field. This second tilt status is shown in FIG. 3. The surveying instrument 10 is brought into the second tilt status based on reading the tilt measuring system 14 until it outputs as a numerical representation indicative of an alignment of the yaw axis Y with the gravity field.

The control system is further configured for calibrating the preconfigured centre point based on the distance to the location on the ground, a deviation between the first tilt status and the second tilt status, the rotatory position of the support unit. The deviation between the first tilt status and the second tilt status is marked D in FIG. 3 and can e.g. be determined by a comparison or mathematical subtraction of the numerical representations of the respective tilt statuses. The preconfigured centre point is not shown in the figures, however, it can (among other options) preferably be located with a certain offset with regard to the surveying instrument or with regard to the survey point itself.

The surveying system may further comprise means for illuminating the ground under the instrument in order to get a good image even under difficult light conditions. For example, such means are a downward-facing lamp or flash light.

In a particular embodiment, the ground image can be captured/displayed with different zoom levels. This would allow for a more precise tapping of the point location in the image.

As a particular functionality, the second distance meter 17 may be configured (or the control system may be configured for effecting the second distance meter) to perform a profile measurement of the survey point 3 in order to find its centre. For this, repeated distance measurements could be performed during a movement of the levelling unit in order to get a profile of the survey point. In this case, the control system would be configured for steering the projection point of the second distance meter across the survey point, in particular a second time in a way 90° turned to the first profile measurement.

One embodiment also can provide a station validity check. Before moving the instrument to a next surveying site, a double-check could be suggested by the control system, e.g. by prompting the surveyor to tap the survey point in the image again, in order to compare the current location of the survey point with the location from the initial setup. The new location could be stored separately. If necessary, the collected measuring data (e.g. point cloud) can be adjusted accordingly in a post-processing based on the comparison. Besides this final check, also a double-check in a planned time interval could be triggered.

In particular, an automatic check can be initialised to verify that the survey point is still where expected. This automatic check could be based on image processing and/or based on automatically triggered profile measurements of the survey point by means of the second distance meter as described above and/or based on a selection made by the surveyor. If for example an unstable ground causes a significant instrument tilt during work, the tilt measuring system can detect such an event and trigger a new automated centering and levelling or suggest it to the surveyor.

In another embodiment, the levelling unit and the camera system could be provided as a modular item. The second distance meter could optionally also be included in the modular item or in the surveying instrument. This means that the centering and levelling functionality is provided by an autonomous tribrach (modular item) with an own power source and communication means and configured to be attached to a surveying instrument.

Figure 4A:
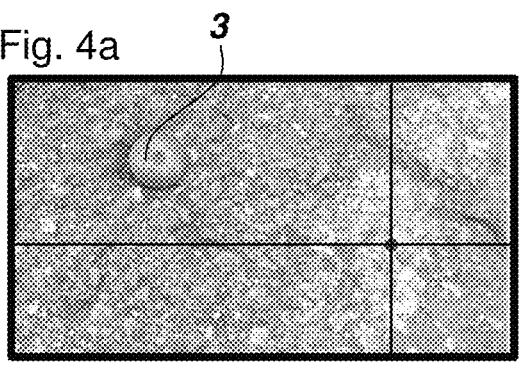
FIGS. 4a to 4c show a first way of how the survey point can be targeted.
Figure 4B:
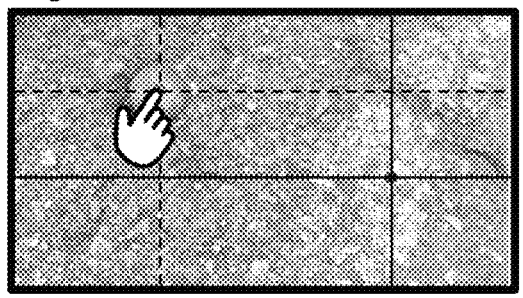
Figure 4C:
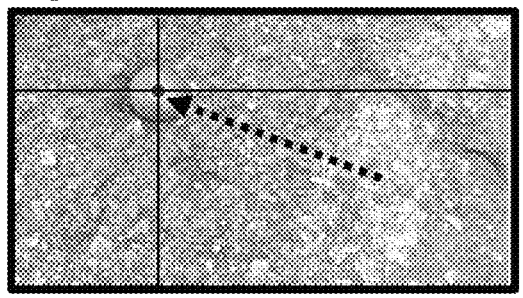

FIGS. 4a to 4c show an interaction of a surveyor and an exemplary graphical user interface (GUI) of a display device optionally comprised by or connected to the surveying system 1. Said display device may particularly be comprised by the surveying instrument 10 or by an external control device. FIGS. 4a to 4c show, by means of the three screenshots, the setup of the surveying system as it is presented by FIGS. 1 to 3.

According to this setup, the camera system stands still because it is arranged on a non-moving part, namely the rigid part 151 of the levelling unit 15. Therefore, the field of view remains the same as long as the tripod 2 is not moved.

In the first screenshot, the initial view of the camera is shown. The solid cross hair shows the current position of the projection of the second distance meter 17 on the ground, which can e.g. be visible as a laser spot light.

In the second screenshot, a surveyor taps on the displaying device (which is indicated by the hand symbol) at the image position where the survey point is displayed. Also, the surveyor could operate a pointing device (such as a trackball, a mouse or a directional pad) comprised by the display device in order to mark the image position where the second distance meter 17 should be pointed at. The dashed cross hair indicates the image position which is then received by the control system. The levelling unit 15 is then effected to adjust the tilt status such that the second distance meter 17 is aiming onto the location on the ground 3.

In the third screenshot (FIG. 4c) the already performed movement of the ground projection of the second distance meter 17 is indicated by the dashed arrow and the solid cross hair has already arrived at the survey point 3.

Figure 5A:
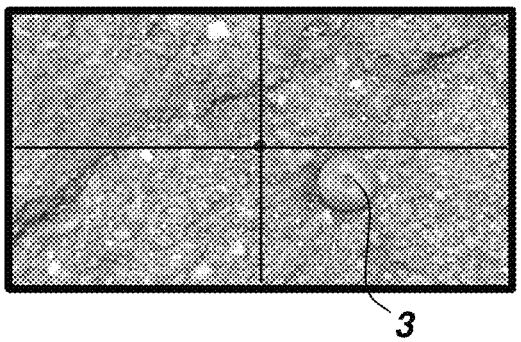
FIGS. 5a to 5c show a second way of how the survey point can be targeted.
Figure 5B:
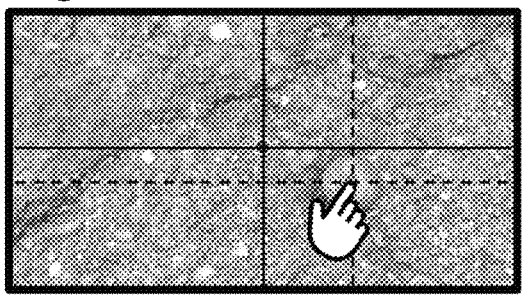
Figure 5C:
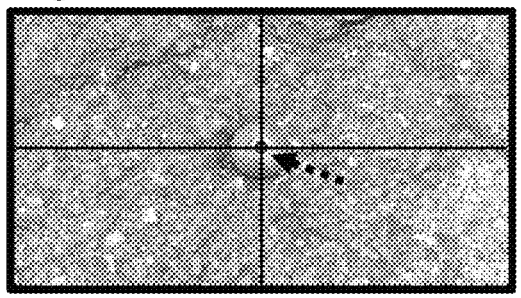

FIGS. 5a to 5c show, by means of another three screenshots of an exemplary GUI, an alternative setup of the surveying system. Therein, the field of view of the camera system 16 is tilted together with the movable part 150 of the levelling unit 15 and the pointing axis of the second distance meter 17. Alternatively, the camera system and the second distance meter are tilted together with the base unit of the surveying instrument (which is effectively the same). Therefore, in the latter case, the camera system and the second distance meter are located in the base unit and the levelling unit has a recess for letting the pointing axis and the field of view of the camera system through.

Of course it is also possible to provide the second distance meter in the base unit and the camera system in the movable part, or vice versa. In this case, the optical axis of the camera/camera system is not aligned with the pointing axis, but they are parallel which is why a location on the ground targeted by the second distance meter would always be assigned to a particular image coordinate of the camera system.

The solid crosshair in FIGS. 5a to 5c remains unchanged because it is linked to the view of the camera. Selecting or determining the location of the survey point 3 in the image (dashed crosshair) causes a tilt state adjustment such that image is shifted and the survey point 17 ends up being targeted by the solid crosshair (=point where the pointing axis of the second distance meter 17 hits the ground).

As an alternative to the manual selection of the survey point 3 according to FIGS. 4b and 5b, the location of the survey point 3 can also be determined automatically by the control system. For example, a variety of possible locations on the ground that would be of interest are stored and a feature recognition algorithm analyses the image in order to detect the location of the respective location on the ground (image processing). If there is ambiguity, the control system may also be configured to provide a choice of two or more locations on the ground such that the user can make a choice manually.

As well, and this may be especially useful when the surveyor taps a touch screen with his finger in order to select or choose an image position, an automatic determination (e.g. based on image processing) could be following said manual selection or choice in order to specify the image position and thus provide a higher accuracy.

Once more summarising the workflow, the surveyor roughly sets up the instrument above the ground point as usual. The tripod only needs to be roughly levelled but the centre area below the instrument should be close enough to the ground point such that the survey point (ground point) is inside the field of view of the one or more downward-facing cameras.

In a particular next step, a representative image of the ground area is taken. The image can be a single image capture, a live stream (video), or a stitched panoramic image collected from more than one camera or different horizontal alignments of the instrument.

The image can be shown to the surveyor, e.g. via a display device, such that he defines the image position in the image where the desired location on the ground is, e.g. by tapping on the point centre in the image. The pixel coordinates of the tapped ground point are used to steer the motors of the levelling unit in order to tilt the second distance meter towards the ground point.

Alternatively or additionally to presenting the image to the surveyor, the image may also be analysed by the control system based on an image processing/analysis (e.g. comprising a classifier or a feature extraction/recognition algorithm), wherein the control system may itself automatically or semi-automatically determine based on the image analysis where the image position is which corresponds to the location on the ground.

The cameras can be calibrated or uncalibrated. In case of using uncalibrated cameras, the levelling unit can be steered iteratively by regularly capturing the offset between the tapped ground point and a current position of the laser spot of the second distance meter. The cameras can also perform a self-calibration in the background by correlating subsequently captured images from the different cameras while the levelling unit is moving the laser spot.

Once the second distance meter is on the ground point, a distance measurement will be triggered to determine the slope distance between the yaw axis and the ground point in this current position. In addition, the current tilt state and the horizontal alignment of the instrument is stored.

Afterwards, the levelling unit starts the levelling processes with the help of its motors. This time the readings of the inclination sensors are steering the motors in such a way that the second inclination sensor with the bigger working range is considered first. Once the instrument tilt is in the working range of the first inclination sensor, those sensor readings are used for fine levelling.

The instrument is then levelled but not exactly above the ground point. Nevertheless, the measured slope distance, the monitored inclination changes in longitudinal and transversal direction and the horizontal alignment and inner and/or outer geometry of the instrument can be used to determine the centre point corrections in terms of relative position (dX, dY) and height (dZ) offsets to the ground point.

These centre point corrections can later be mathematically applied to the standard setup and to orientation methods or a modification thereof. Alternatively, the centre point corrections can be used for a physical compensation by moving the instrument towards the ground point with regard to the XY plane.

Although the invention is illustrated above, partly with reference to some preferred embodiments, it must be understood that numerous modifications and combinations of different features of the embodiments can be made. All of these modifications lie within the scope of the appended claims.

What is claimed is:

1. A surveying system comprising a surveying instrument and a control system,
   the surveying instrument comprising:
      a base unit,
      a support unit mounted on the base unit and configured for being rotatable relative to the base unit around a yaw axis,
      a targeting unit comprising a first distance meter, the targeting unit being mounted on the support unit and configured for being rotatable relative to the support unit around a pitch axis,
      a first angle encoder configured for measuring a rotatory position of the support unit, and
      a second angle encoder configured for measuring a rotatory position of the targeting unit,
   the control system being configured for:
      controlling the surveying instrument, and
      determining a spatial point relative to a preconfigured centre point of the surveying instrument,
   wherein, the surveying system further comprises:
      a tilt measuring system configured for determining a tilt status of the yaw axis with respect to a longitudinal direction and a transversal direction relative to the gravity field,
      a levelling unit configured for adjusting the tilt status, wherein the base unit is configured for being mounted on the levelling unit,
      a camera system configured for capturing an image of a ground under the levelling unit, and
      a second distance meter configured for measuring a distance to a point on the ground along a pointing axis, the pointing axis and the yaw axis having a known pose relative to each other,
   wherein the control system is configured for:
      at least one of receiving or determining an image position of the image, the image position corresponding to a location on the ground,
      effecting the levelling unit to adjust the tilt status, based on the image position, until a first tilt status is obtained, the second distance meter aiming onto the location on the ground in the first tilt status,
      effecting the tilt measuring system to determine the first tilt status,
      effecting the second distance meter to measure a distance to the location on the ground,
      effecting the first angle encoder to measure a rotatory position of the support unit,
      effecting the levelling unit to adjust the tilt status, based on sampling the tilt measuring system, until a second tilt status is obtained, the yaw axis being aligned with the gravity field in the second tilt status, and
      calibrating the preconfigured centre point based on:
         the measured distance to the location on the ground,
         a deviation between the determined first tilt status and the second tilt status, and
         the measured rotatory position of the support unit.

2. The surveying system according to claim 1, the tilt measuring system comprising:
   a first inclinometer configured for a first level of accuracy and a first working range, and
   a second inclinometer configured for a second level of accuracy higher than the first level of accuracy and a second working range smaller than the first working range.

3. The surveying system according to claim 2, wherein the determination of the first tilt status comprises:
   if the yaw axis is out of the second working range, sampling the first inclinometer, and
   if the yaw axis is within the second working range, sampling the second inclinometer.

4. The surveying system according to claim 3, wherein sampling the tilt measuring system comprises:
   as long as the yaw axis is out of the second working range, sampling the first inclinometer, and
   once the yaw axis is within the second working range, sampling the second inclinometer.

5. The surveying system according to claim 1, wherein effecting the levelling unit to adjust the tilt status until a first tilt status is obtained is based on a transformation of the image position into:
   the first tilt status, or
   a tilt status adjustment that leads to the first tilt status.

6. The surveying system according to claim 1, wherein, in case the control system is configured for receiving the image position, the receiving is based on a user selection, wherein the surveying system comprises a display device configured for connecting to the control system, for displaying the captured image, and for accepting the user selection as input.

7. The surveying system according to claim 1, wherein, when the control system is configured for determining the image position, the determining is based on image processing.

8. The surveying system according to claim 1, wherein the image position is corresponding to a survey point on the ground.

9. The surveying system according to claim 1, wherein the pointing axis and a field of view of the camera system have a known pose relative to each other, and wherein effecting the levelling unit to adjust the tilt status until a first tilt status is obtained is further based on the relative pose between the pointing axis and the field of view of the camera system and based on the relative pose between the pointing axis and the yaw axis.

10. The surveying system according to claim 1, wherein the camera system comprises one or more cameras, and the camera system is configured for providing an image, a stitched image, or a live stream of images.

11. The surveying system according to claim 1, wherein the camera system is:
configured for being mountable on the surveying instrument, on a tripod, or on the levelling unit, or
embodied as or comprised by a handheld device.

12. The surveying system according to claim 1, wherein the second distance meter and the camera system are kinematically linked.

13. A method for calibrating a preconfigured centre point of a surveying instrument comprised by a surveying system according to claim 1, the method comprising, with the control system:
capturing a first image of a ground under the levelling unit,
at least one of receiving and determining an image position of the first image, the image position of the first image corresponding to a location on the ground,
effecting the levelling unit to adjust the tilt status, based on the first image position of the first image, until a first tilt status is obtained, the second distance meter aiming onto the location on the ground in the first tilt status,
effecting the tilt measuring system to determine the first tilt status,
effecting the second distance meter to measure a first distance to the location on the ground,
effecting the first angle encoder to measure a first rotatory position of the support unit,
effecting the levelling unit to adjust the tilt status, based on sampling the tilt measuring system, until a second tilt status is obtained, the yaw axis being aligned with the gravity field in the second tilt status, and
calibrating, at a first time, the preconfigured centre point based on:
the measured first distance to the location on the ground,
a deviation between the determined first tilt status and the second tilt status, and
the first measured rotatory position of the support unit.

14. The method according to claim 13, comprising:
collecting measurement data with the surveying system,
capturing a second image of a ground under the levelling unit,
at least one of receiving and determining an image position of the second image a second time, the image position of the second image corresponding to the location on the ground,
effecting the levelling unit to adjust the tilt status, based on the image position of the second image, until a third tilt status is obtained, the second distance meter aiming onto the location on the ground in the third tilt status,
effecting the tilt measuring system to determine the third tilt status,
effecting the second distance meter to measure a second distance to the location on the ground,
effecting the first angle encoder to measure a second rotatory position of the support unit,
effecting the levelling unit to adjust the tilt status, based on sampling the tilt measuring system, until a fourth tilt status is obtained, the yaw axis being aligned with the gravity field in the fourth tilt status, and
calibrating, at a second time, the preconfigured centre point, which was calibrated at the first time before collecting the measurement data, based on:
the second measured distance to the location on the ground,
a deviation between the determined third tilt status and the fourth tilt status, and/or
the second measured rotatory position of the support unit, and
when the calibrating at the second time results in a correction of the preconfigured centre point and said correction amounting higher than a threshold correction, correcting the measurement data based on the calibrating at the second time.

15. A levelling unit designed for being modularly mounted under a surveying instrument, wherein the surveying instrument comprises:
a base unit configured for being mounted on the levelling unit,
a support unit mounted on the base unit and configured for being rotatable relative to the base unit around a yaw axis,
a targeting unit comprising a first distance meter, the targeting unit being mounted on the support unit and configured for being rotatable relative to the support unit around a pitch axis,
a first angle encoder configured for measuring a rotatory position of the support unit,
a second angle encoder configured for measuring a rotatory position of the targeting unit,
a first control unit configured for controlling the surveying instrument and determining a spatial point relative to a preconfigured centre point of the surveying instrument, and
a second distance meter configured for measuring a distance to a point on the ground along a pointing axis, the pointing axis and the yaw axis having a known pose relative to each other,
wherein the levelling unit comprises:
a recess configured for allowing the pointing axis to pass through,
a tilt measuring system configured for determining a tilt status with respect to a longitudinal direction and a transversal direction of the yaw axis relative to the gravity field, wherein the levelling unit is configured for adjusting the tilt status,
a camera system configured for capturing an image of a ground under the levelling unit, a second control unit configured for connecting to the first control system, and for:
  at least one of receiving and determining an image position of the image,
  the image position corresponding to a location on the ground,
  effecting the levelling unit to adjust the tilt status, based on the image position, until a first tilt status is obtained, the second distance meter aiming onto the location on the ground in the first tilt status,
  effecting the tilt measuring system to determine the first tilt status,
  effecting the second distance meter to measure a distance to the location on the ground,
  effecting the first angle encoder to measure a rotatory position of the support unit,
  effecting the levelling unit to adjust the tilt status, based on sampling the tilt measuring system, until a second tilt status is obtained, the yaw axis being aligned with the gravity field in the second tilt status, and
  calibrating the preconfigured centre point based on:
    the measured distance to the location on the ground,
    a deviation between the determined first tilt status and the second tilt status, and
    the measured rotatory position of the support unit.

* * * * *